(12) United States Patent
Kobayashi et al.

(10) Patent No.: US 11,549,375 B2
(45) Date of Patent: Jan. 10, 2023

(54) AIRBAG DEVICE

(71) Applicant: General Electric Company, Schenectady, NY (US)

(72) Inventors: Yuto Kobayashi, Kanagawa (JP); Tsutomu Sakurai, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/072,356

(22) Filed: Oct. 16, 2020

(65) Prior Publication Data
US 2022/0266787 A1    Aug. 25, 2022

(30) Foreign Application Priority Data

Oct. 18, 2019  (JP) ................................. 2019-191433
Aug. 31, 2020  (JP) ................................. 2020-145955

(51) Int. Cl.
| | |
|---|---|
| *B60R 21/207* | (2006.01) |
| *B60R 21/231* | (2011.01) |
| *B60R 21/2338* | (2011.01) |
| *F01D 5/14* | (2006.01) |
| *F01D 5/22* | (2006.01) |

(52) U.S. Cl.
CPC ............ *F01D 5/141* (2013.01); *B60R 21/207* (2013.01); *B60R 21/2338* (2013.01); *B60R 21/23138* (2013.01); *F01D 5/225* (2013.01); *B60R 2021/23146* (2013.01); *F05D 2220/31* (2013.01); *F05D 2240/301* (2013.01); *F05D 2250/71* (2013.01)

(58) Field of Classification Search
None
See application file for complete search history.

(56) References Cited

U.S. PATENT DOCUMENTS

| | | | |
|---|---|---|---|
| 7,314,228 B2 * | 1/2008 | Ishiguro | B60R 21/2035 280/743.2 |
| 8,272,664 B2 * | 9/2012 | Benny | B60R 21/201 280/743.1 |
| 9,849,858 B2 * | 12/2017 | Inazumi | B60R 21/2338 |
| 10,029,589 B2 * | 7/2018 | Tanabe | B60R 21/207 |
| 11,214,215 B2 * | 1/2022 | Kobayashi | B60R 21/237 |
| 2021/0300284 A1 * | 9/2021 | Kabeya | B60R 21/235 |
| 2022/0227326 A1 * | 7/2022 | Kobayashi | B60N 2/58 |

* cited by examiner

*Primary Examiner* — Faye M Fleming

(74) *Attorney, Agent, or Firm* — Harness, Dickey & Pierce, P.L.C.; Stephen T. Olson

(57) ABSTRACT

The present invention is an airbag device mounted on one side of a vehicle seat in which both ends of a seat-shaped cushion that are opposed in expansion and deployment and longitudinal directions during expansion and deployment are respectively bent a plurality of times and formed into molded parts R1, R2, and is provided with a first holding member 43 that holds the first molded part R1 on one end of either of the ends at least until the start of expansion and deployment and a second holding member 44 that holds the second molded part R2 on the other end at least until the start of expansion and deployment.

10 Claims, 11 Drawing Sheets

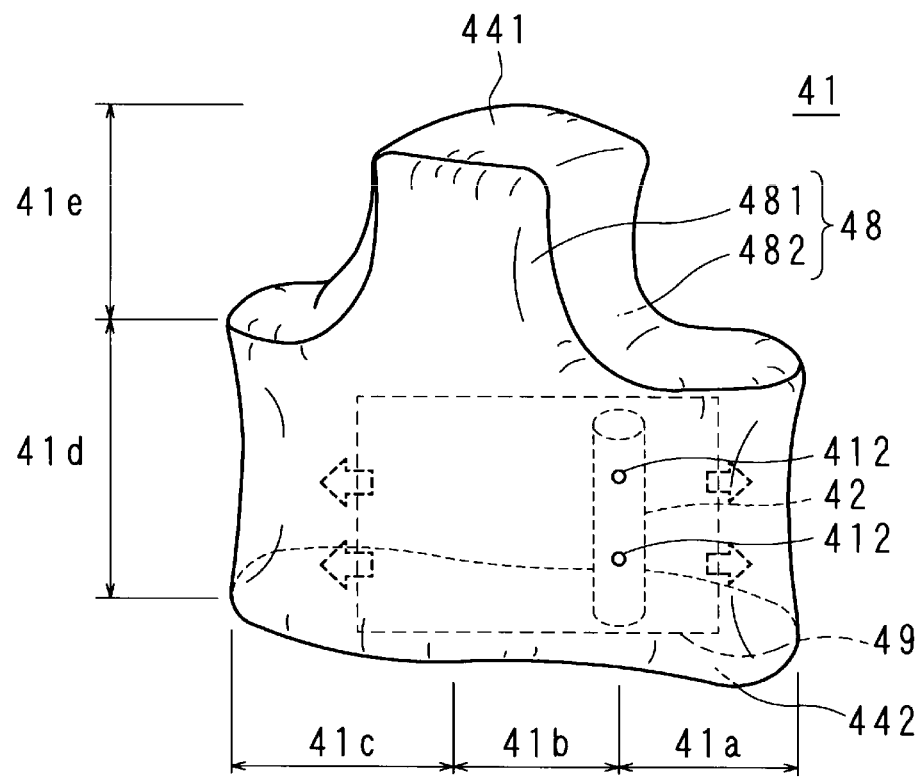
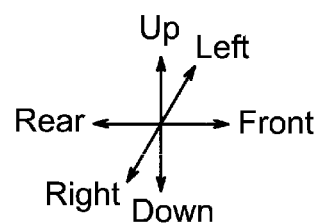
FIG. 4

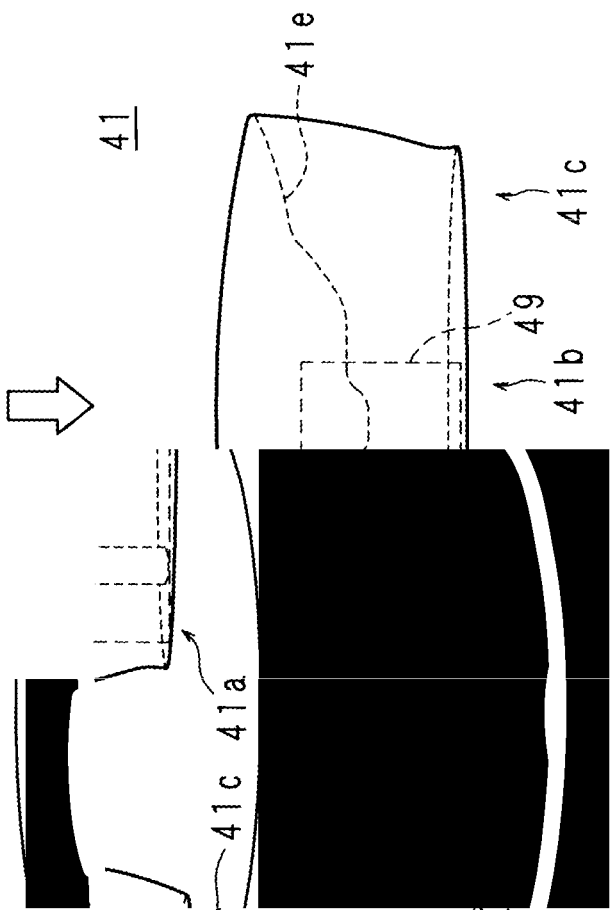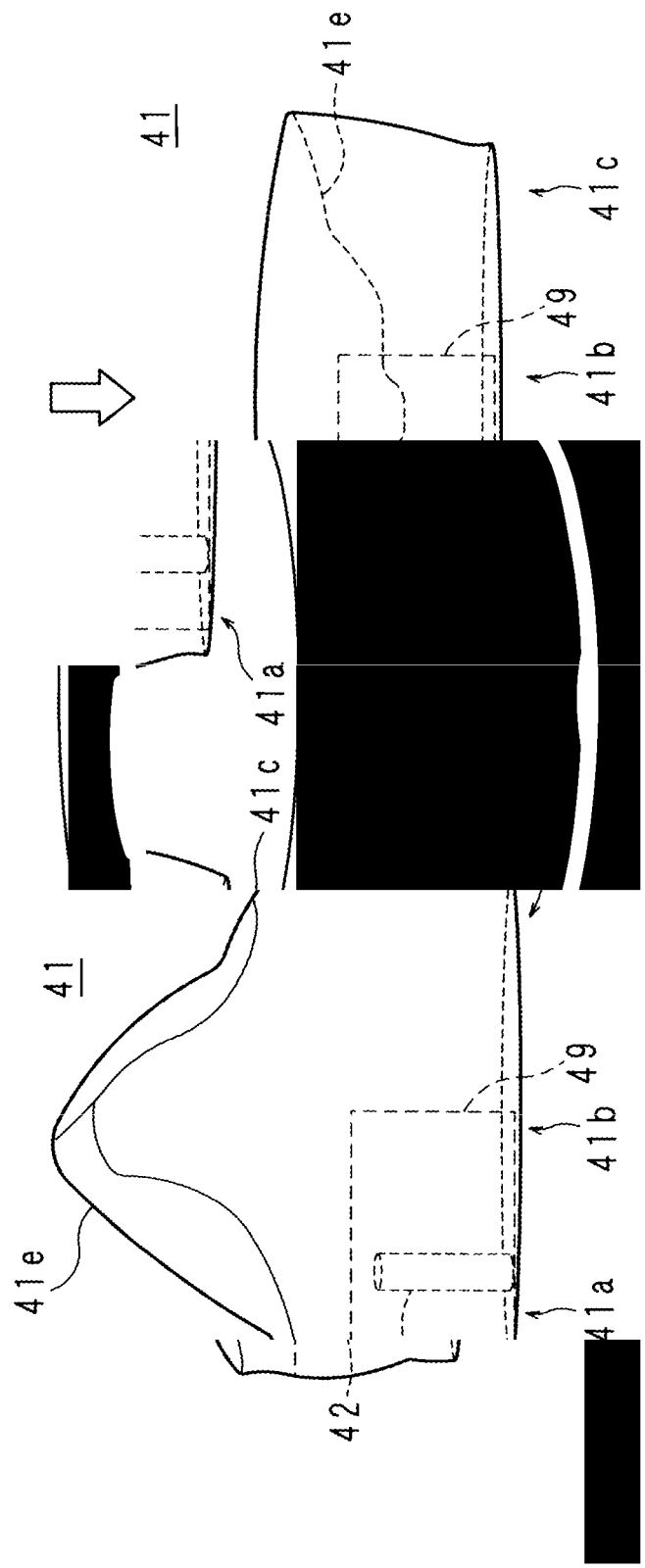

AIRBAG DEVICE

TECHNICAL FIELD

The present invention relates to an airbag device.

BACKGROUND

Airbag devices have become widely used in recent years. An airbag device is a safety device that activates in an emergency such as a vehicle collision, where the airbag expands and deploys under gas pressure to stop and protect the occupant.

Patent Reference 1 discloses a vehicle seat unit in which an airbag is mounted within the side of a vehicle seat with the airbag stowed within a flexible cover, and in the event of a vehicle collision, the airbag tears through the cover and expands and deploys to the front side of the vehicle seat.

RELATED ART DOCUMENTS

Patent Documents

[Patent Reference 1] U.S. Patent Application Publication No. 2012/0175924

SUMMARY OF THE INVENTION

Problem to be Solved by the Invention

On the other hand, there are various types of airbag devices depending on the application, such as those equipped with cushions (airbags) having a plurality of portions that expand and deploy in different directions. In the case of such an airbag device, each portion must be folded separately and stowed inside the vehicle seat to avoid any problems of the portions becoming entangled during expansion and deployment. However, if each portion is not kept folded or the arrangement of each portion is not maintained, the portions may cause a problem by becoming entangled during expansion and deployment.

However, the vehicle seat unit in Patent Reference 1 does not account for a case where the cushion is provided with a plurality of portions that expand and deploy in various directions, and cannot maintain the folded state of the plurality of portions and cannot preserve the arrangement thereof, during expansion and deployment.

The present invention takes this circumstance into account, and an objective thereof is to provide an airbag device installed in a state in which a cushion is formed with a plurality of molded parts bent a plurality of times, can maintain the shape of each molded part without interfering with expansion and deployment, and can preserve the arrangement of each molded part.

Means for Solving the Problem

The airbag device according to the present invention is an airbag device mounted on one side of a vehicle seat in which both ends of a seat-shaped airbag that are opposed in horizontal and longitudinal directions during expansion and deployment are bent a plurality of times, wherein the airbag device is provided with a first holding member that holds the first molded part on one end of either of the ends at least until the start of expansion and deployment and a second holding member that holds the second molded part on the other end at least until the start of expansion and deployment.

Effect of the Invention

According to the present invention, in an airbag device mounted in a state in which a plurality of molded parts in which a cushion is bent a plurality of times are formed, the present invention provides an airbag device that can maintain the shape of each molded part without interfering with expansion and deployment, and that can preserve the arrangement of each molded part.

BRIEF DESCRIPTION OF THE DRAWINGS

FIG. 4 is a perspective view illustrating an example of a cushion according to embodiment 1.

FIGS. 5A and 5B are explanatory views illustrating the method in which the cushion is folded according to embodiment 1.

EMBODIMENT OF THE INVENTION

The airbag device according to the embodiment of the present invention will be described in detail according to the diagrams below. The airbag device according to the embodiment of the present invention is equipped to a seat of a vehicle.

As used in the following description, "up" of the vehicle is towards the ceiling direction of the vehicle, "down" is towards the floor direction of the vehicle, and the "vertical direction" is in the direction of the opposing ceiling and floor. In addition, the forward direction of the vehicle shall be the "forward" direction and the backward direction of the vehicle shall be the "backward" direction. Further, the width direction of the vehicle is the direction that intersects with the forward or backward direction of the vehicle and is orthogonal to the "forward and backward" direction.

Embodiment 1

Figure 1:
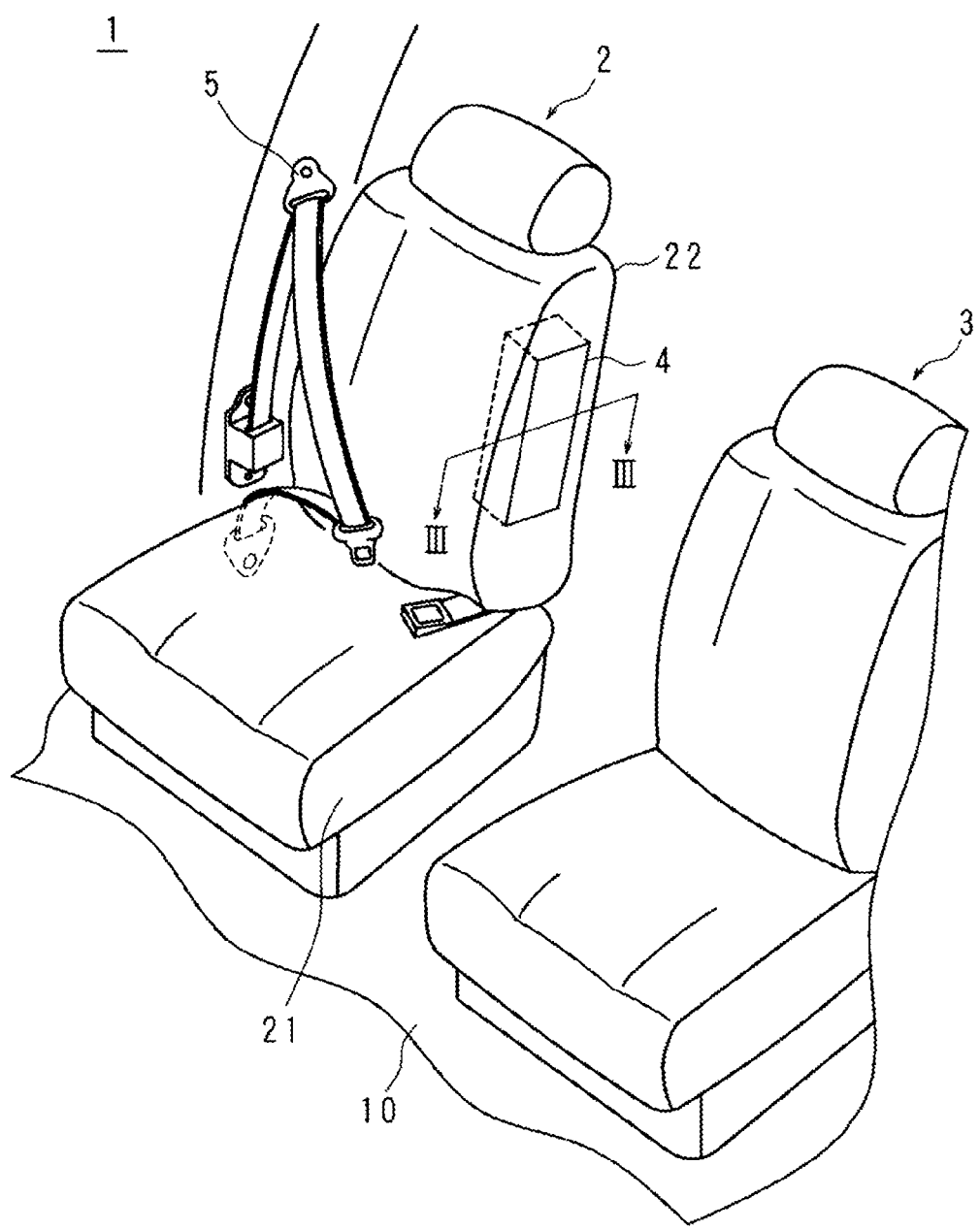
FIG. 1 is a partial perspective view schematically illustrating the inside of a vehicle provided with an airbag device according to embodiment 1.
Figure 2:
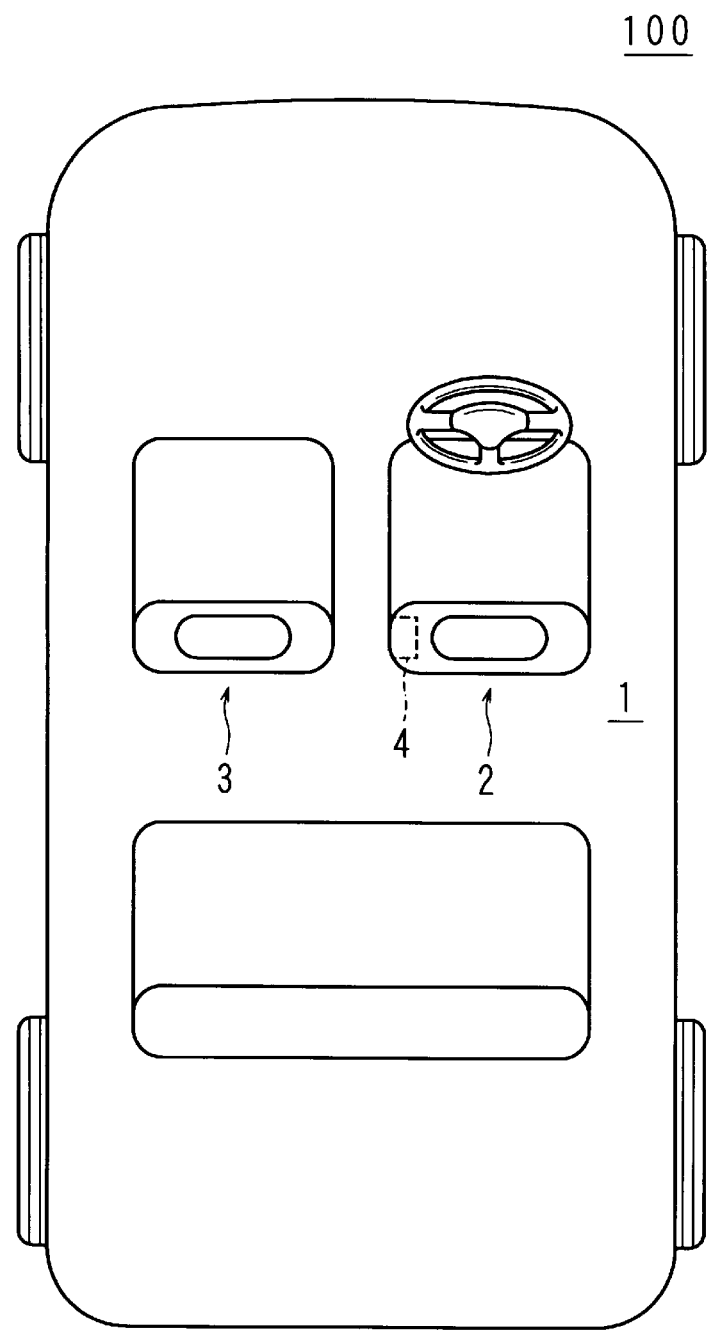
FIG. 2 is a plan view schematically illustrating the interior of the vehicle provided with the airbag device according to embodiment 1.

FIG. 1 is a partial perspective view schematically illustrating the inside of a vehicle having an airbag device 4 according to embodiment 1. The airbag device 4 of the present embodiment is a so-called side airbag device. FIG. 2 is a plan view schematically illustrating the inside of the vehicle having the airbag device 4 according to embodiment 1. FIG. 1 and FIG. 2 illustrate a driver seat 2 and a passenger seat 3 installed on a floor 10 of a passenger compartment 1, as well as a seat belt 5. The driver seat 2 includes a seat portion 21 and a backrest 22 that rises upward from the rear side of the seat portion 21.

As illustrated in FIG. 2, the airbag device 4 according to embodiment 1 is arranged on the inner side of the backrest 22 of the driver seat 2 installed in the passenger compartment 1 of a vehicle 100 on the passenger seat 3 side thereof.

Figure 3:
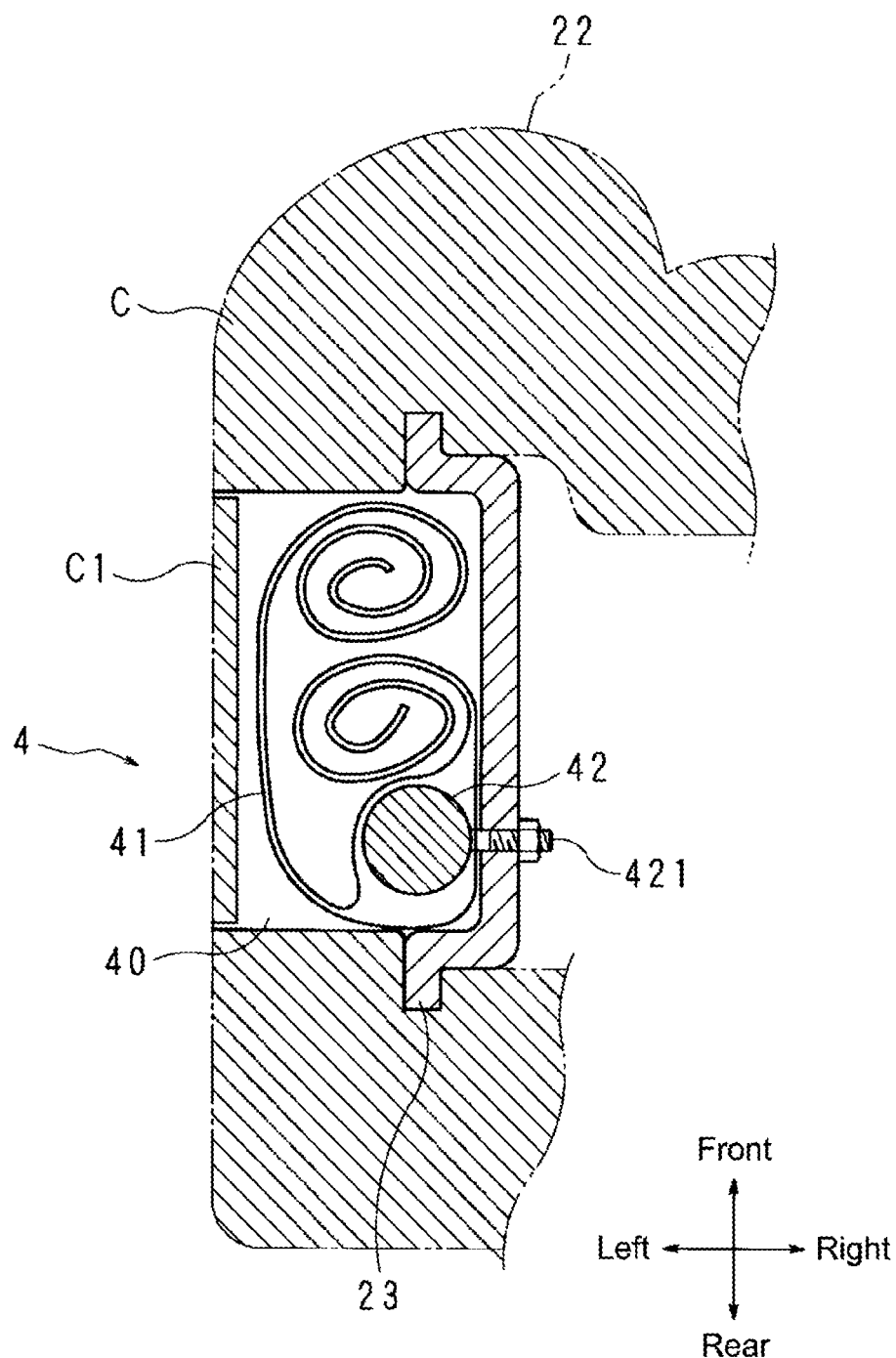
FIG. 3 is a cross-sectional view of the airbag device along line III-III in FIG. 1.

FIG. 3 is a cross-sectional view of the airbag device 4 along line III-III in FIG. 1. The airbag device 4 is provided with a cushion 41 (airbag) and an inflator 42, stowed in a stowing space 40 on the passenger seat 3 side of the backrest 22.

The cushion 41 is, for example, a bag body made of fabric reinforced by braiding of high-strength fibers such as nylon fibers, and is folded into a roll or bellows shape and stowed in the stowing space 40. The shape of the cushion 41 and the method of folding thereof will be described below.

The inflator 42 is secured to the skeleton frame 23 of the backrest 22 by stud bolts 421 (securing members). The skeleton frame 23 is an example of a structure provided in the passenger compartment 1. The inflator 42 is provided inside the cushion 41 and injects gas inside the cushion 41 to cause expansion and deployment.

The skeleton frame 23 is covered with a cover, and a buffer material C is interposed between the skeleton frame 23 and the cover. That is to say, that the skeleton frame 23 is covered by the buffer material C.

The stowing space 40 is a concave space formed by the buffer material C and the skeleton frame 23 within the side of the backrest 22, and is open on the surface side. That is to say, that the opening of the stowing space 40 faces toward the passenger seat 3 and is covered by the plate cover C1, such that the stowing space 40 is flush with the side of the driver seat 2.

The plate cover C1 is the same material as the buffer material C, for example. The cushion 41 expands under the action of the injection gas from the inflator 42 during a collision of the vehicle 100, breaking the plate cover C1 and expanding laterally. The plate cover C1 can be made of a resin material weaker than the expansion force of the cushion 41 during expansion and deployment.

FIG. 4 is a perspective view illustrating an example of the cushion 41 according to embodiment 1. FIG. 4 illustrates the cushion 41 when expanded. The direction illustrated in FIG. 4 illustrates the direction of the vehicle 100. The cushion 41 is formed with a convex shape provided with a horizontal part 41d that expands in the horizontal direction of the vehicle 100 and a protruding part 41e that expands from the center portion of the horizontal part 41d in the upper direction of the vehicle 100.

The cushion 41 is an article where a first panel 481 and a second panel 482 are joined by means of a gusset part that provides thickness to the opposing direction of the first panel 481 and the second panel 482. The second panel 482 has the shape of the first panel 481 turned upside down. The first panel 481 and the second panel 482 are hereafter also referred to as a panel 48.

The gusset part includes a first gusset part 441 that joins the upper part of the first panel 481 and the second panel 482 together and a second gusset part 442 that joins the lower part of the first panel 481 and the second panel 482 together. The first gusset portion 441 and the second gusset portion 442 have an oval shape.

A straightening sheet 49 is attached to the inner surface of the first panel 481. A cylinder-type (tubular) inflator 42 is arranged between the first panel 481 and the straightening sheet 49. The flow of gas injected from the inflator 42 is regulated by the straightening sheet 49. The straightening sheet 49 is described below.

In addition, regarding the first panel 481, the horizontal part 41d is made up of a rectangular portion extending in the front-rear direction (see FIG. 4). The inflator 42 is provided in such a rectangular portion near the front end of one of the opposing ends in the front and rear direction. The inflator 42 is provided in such a way that the longitudinal direction thereof is parallel to the direction orthogonal to the opposing direction of both ends (vertical direction).

The first panel 481 and the second panel 482 are joined together at the short sides of the rectangular portions, respectively. In addition, regarding the first panel 481 and the second panel 482, the edge of the protruding part of one long side of the rectangular portion is joined with the first gusset part 441. The other long side of the rectangular portion of the first panel 481 and the second panel 482 is joined with the second gusset part 442.

This allows the first panel 481, the second panel 482, the first gusset part 441, and the second gusset part 442 to be joined together in a bag shape. The first panel 481, the second panel 482, the first gusset part 441 and the second gusset part 442 can be joined by any arbitrary bonding technique, such as sewing, gluing, welding, and the like, for example.

The first panel 481 is formed with two (2) insertion holes 412 in a line in the vertical direction, where the stud bolts 421 are inserted. Note that while FIG. 4 illustrates a case where there are two (2) insertion holes 412, there can be one (1) or three (3) insertion holes 412.

The inflator 42 operates in the event of a collision and the like of the vehicle 100, and injects gas into the interior of the cushion 41. The cushion 41 expands instantaneously based on the action of the injection gas from the inflator 42. The expansion pressure of the cushion 41 acts on the plate cover C1 and, as described above, the cushion 41 breaks the plate cover C1 and expands and deploys outside the stowing space 40. Note that, hereinafter, expansion and deployment can also be referred to simply as deployment.

The straightening sheet 49 is rectangular and is secured to the first panel 481 so that the longitudinal direction thereof is parallel to the longitudinal direction of the rectangular portion of the first panel 481. The straightening sheet 49 is secured to the first panel 481 using any arbitrary securing means, for example, such as sewing, adhesion based on an adhesive, and the like. An inflator 42 is placed between the first panel 481 and the straightening sheet 49.

Only the edges of both long sides of the straightening sheet 49 are secured to the first panel 481. That is to say, that the straightening sheet 49 is open along the entire lengths of both short sides and closed on the entire lengths of both long sides, blocking the space between the protruding part 41e of the cushion 41 and the inflator 42.

The dashed arrows in FIG. 4 indicate the flow of gas from the inflator 42. The gas injected from the inflator 42 is discharged from the short side of the straightening sheet 49 and fills the entire interior of the cushion 41.

In the following description, for convenience of explanation, the cushion 41 is conceptually assumed to be made up of three (3) parts. The part from the inflator 42 to one end of the front side, bordering the position where the inflator 42 is located, is a first part 41a. The part from the inflator 42 to the other end of the rear side is divided into two parts, where the part near the other end is a third part 41c and the part near the first part 41a is a second part 41b. That is to say, that the second part 41b is interposed between the first part 41a and the third part 41c. The boundary between the first portion 41a and the second portion 41b and the boundary between the second portion 41b and the third portion 41c are not precise.

FIGS. 5A and 5B may be collectively referenced as "FIG. 5" herein. FIGS. 6A-6F may be collectively referenced as "FIG. 6" herein. FIG. 5 and FIG. 6 are explanatory views illustrating the method in which the cushion 41 according to embodiment 1 is folded. FIG. 5 illustrates how the cushion 41 is folded into a rectangular shape. The protruding part 41e of the cushion 41 folds into the inside of the cushion 41, as illustrated in FIG. 5A. That is to say, that the protruding part 41e is pushed between the first panel 481 and the second panel 482. Alternatively, the convex portion can be folded in the front and back direction of the diagram. The bottom portion of the cushion 41 also folds in between the first panel 481 and second panel 482, in the same manner as the protruding part 41e. This causes the cushion 41 to go from the state of FIG. 5A to the state of FIG. 5B.

FIG. 6 illustrates a folding method for stowing the cushion 41 in the stowing space 40. FIG. 6 is a view of the cushion 41 folded as illustrated in FIG. 5B, viewed from the white arrow in FIG. 5B. For convenience of explanation, the straightening sheet 49 is omitted in FIG. 6.

Figure 6A:
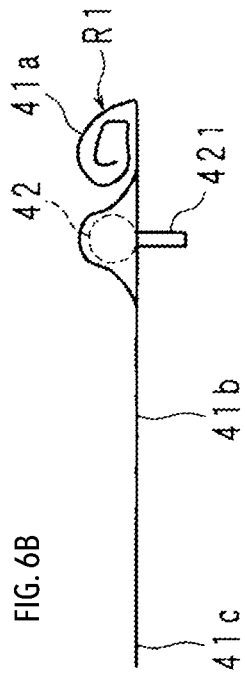
FIGS. 6A through 6F are explanatory views illustrating the method in which the cushion is folded according to embodiment 1.

In order to stow the cushion 41 in the stowing space 40, one end of the first part 41a and the other end of the third part 41c, corresponding to the horizontal longitudinal direction during expansion and deployment of the cushion 41, are bent and folded a plurality of times. As illustrated in FIG. 6A and FIG. 5B, the cushion 41 before folding is in the form of an oblong sheet, with only the part of the cushion where the inflator 42 is provided protruding in the thickness direction. One end of the first part 41a and the other end of the third part 41c are bent and folded, for example, into a roll or bellows shape. The following describes using bending and folding into a roll as an example.

Figure 6B:
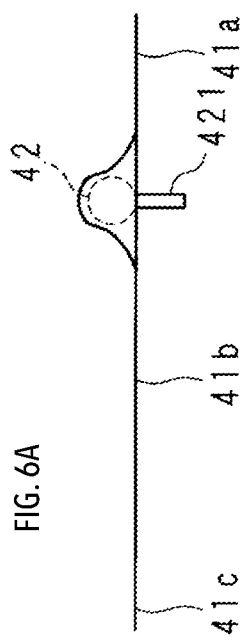

First, as illustrated in FIG. 6B, one end of the first part 41a is bent a plurality of times toward the inflator 42 and folded into a roll. For example, the direction of the bend is clockwise as seen from the white arrow in FIG. 5B. This method of folding is hereafter referred to as "clockwise roll winding." This forms a roll-shaped first molded part R1 (the first molded part) in the first part 41a (see FIG. 6B).

Figure 6C:
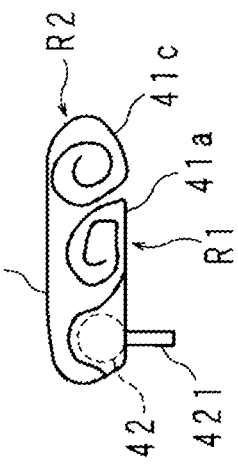

Next, as illustrated in FIG. 6C, the second part 41b and third part 41c are folded back to the side of the first part 41a (first molded part R1) relative to the inflator 42. Here, the first molded part R1 of the first part 41a is covered by the second part 41b.

Figure 6D:
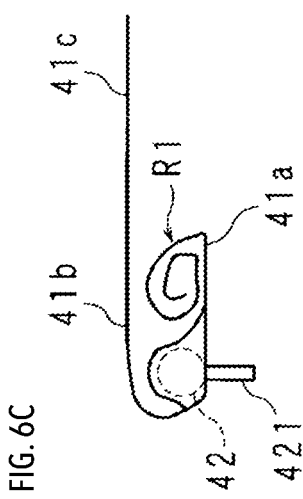

Next, as illustrated in FIG. 6D, the other end of the third part 41C is bent a plurality of times toward the inflator 42 and folded into a roll. When bending, the bend is made in the counterclockwise direction. This type of folding is hereafter referred to as "counterclockwise roll winding." This results in the formation of a roll-shaped second molded part R2 (second molded part) in the third part 41c (see FIG. 6D), with the first molded part R1 of the first part 41a sandwiched between the second molded part R2 of the third part 41c and the inflator 42. That is to say, that the inflator 42, the first molded part R1 and the second molded part R2 are arranged in a row in the cushion 41 before expansion and deployment, with the first molded part R1 interposed between the inflator 42 and the second molded part R2.

Figure 6E:
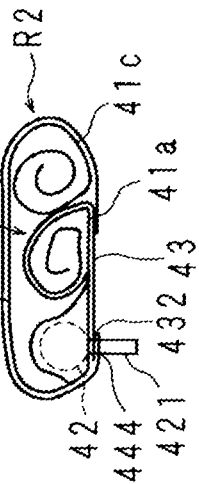
Figure 6F:
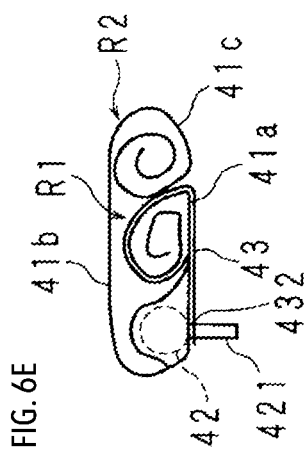

Thereafter, as illustrated in FIG. 6E and FIG. 6F, the first molded part R1 is held by mounting a first holding member 43 that holds the first molded part R1 of the first part 41a at least until the start of expansion and deployment, and the second molded part R2 of the third part 41c is held by mounting a second holding member 44 that holds the second molded part R2 at least until the start of expansion and deployment. The first holding member 43 and second holding member 44 have a belt-like shape with a predetermined width and are made of non-woven fabric, the same or the same type of fabric, or the like, as the cushion 41.

The first holding member 43 has a through hole 432 formed at one end in the longitudinal direction through which a stud bolt 421 can be inserted. One end of the first holding member 43 is engaged with the stud bolt 421 by inserting the stud bolt 421 into the through hole 432 of the first holding member 43. The first holding member 43 surrounds the first molded part R1 from the side of the first panel 481, and the other end is temporarily joined to the second panel 482 between the inflator 42 and the first molded part R1 in a manner that can be released during expansion and deployment (see FIG. 6E). For example, the other end of the first holding member 43 is temporarily attached to the second panel 482 with an adhesive or sewn into the second panel 482 in a manner that can be easily ripped or detached. Below is a description of an example where the other end of the first holding member 43 is sewn onto the second panel 482 (see the seam S1 in FIG. 8). In this manner, the first holding member 43 surrounds the first molded part R1, such that the shape and position of the first molded part R1 is retained until the time of expansion and deployment.

The second holding member 44 has a through hole 444 at one end in the longitudinal direction through which the stud bolt 421 can be inserted. One end of the second holding member 44 is engaged with the stud bolt 421 by inserting the stud bolt 421 into the through hole 444 of the second holding member 44. The second holding member 44 covers the inflator 42 and the first molded part R1 and surrounds the second molded part R2 from the side of the first panel 481. The other end of the second holding member 44 is temporarily joined to the first holding member 43 in a manner that can be released during expansion and deployment (see FIG. 6F). For example, the other end of the second holding member 44 is temporarily fastened to the first holding member 43 with an adhesive or sewn in a manner that can be easily ripped or detached. In this manner, the second holding member 44 surrounds the second molded part R2 such that the shape and position of the second molded part R2 is retained until the time of expansion and deployment.

Thus, since the first molded part R1 is held by the first holding member 43 and the second molded part R2 is held by the second holding member 44 until the time of expansion and deployment, problems such as entanglement of the first part 41a and the third part 41c at the time of expansion and deployment can be prevented beforehand.

Figure 7:
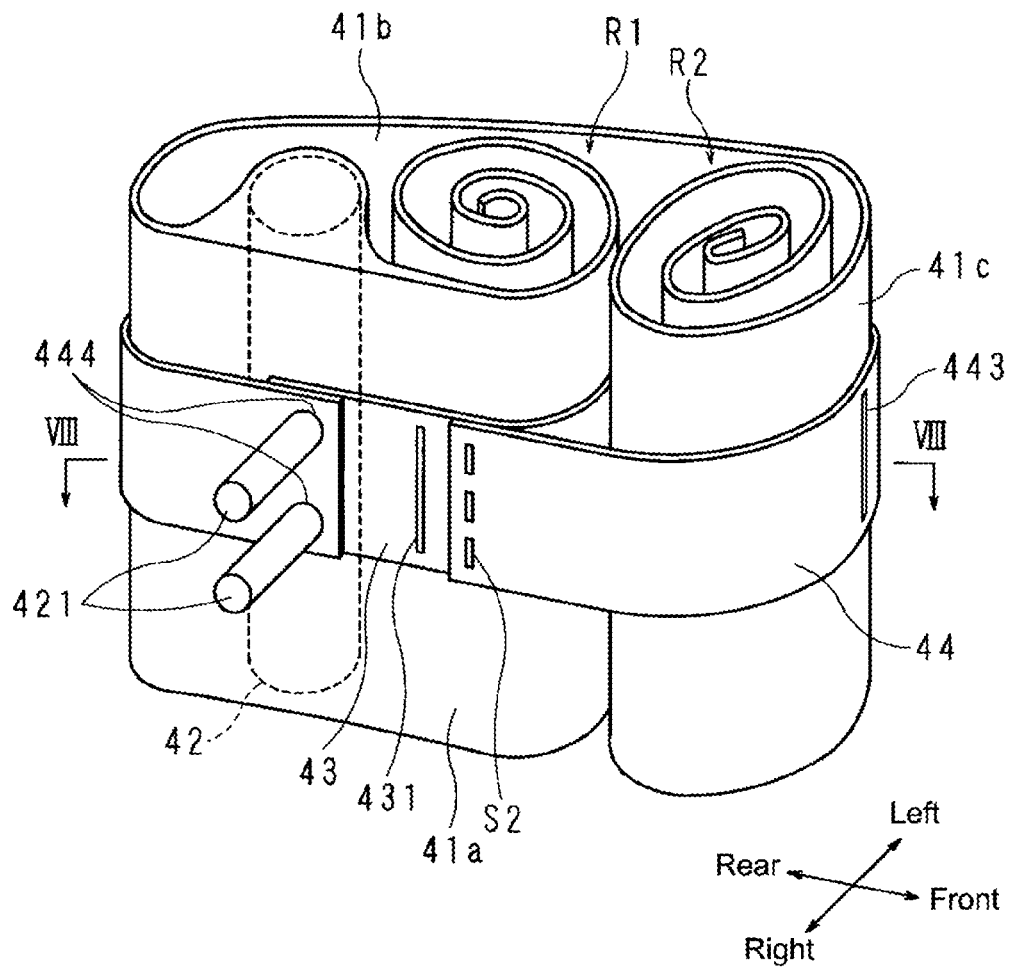
FIG. 7 is a perspective view schematically representing the cushion in the state shown in FIG. 6E.
Figure 8:
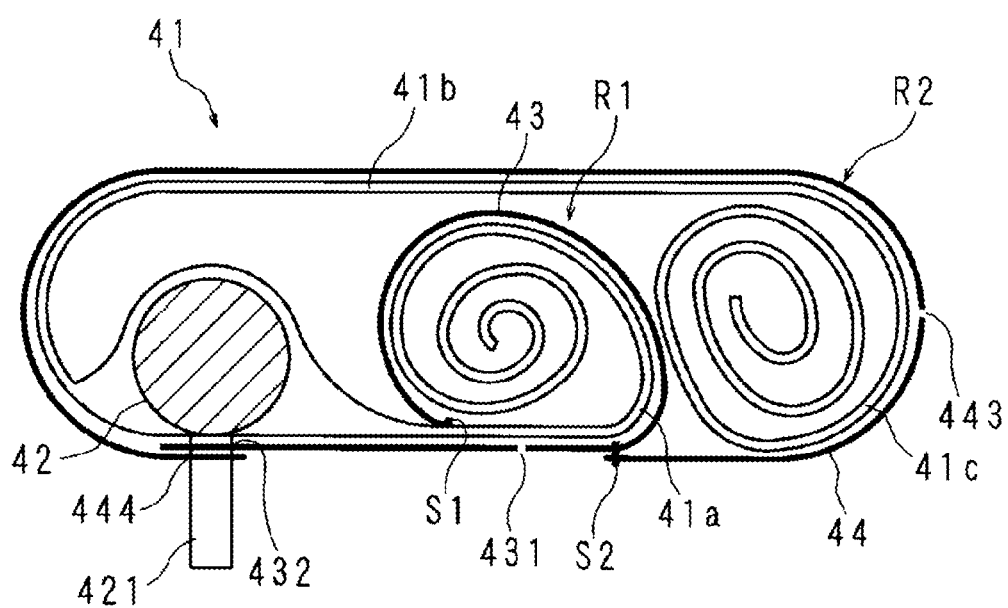
FIG. 8 is a cross-sectional view taken along the VIII-VIII line in FIG. 7.

FIG. 7 is a perspective view schematically representing the cushion 41 in a state as illustrated in FIG. 6E. FIG. 8 is a cross-sectional view taken along the VIII-VIII line in FIG. 7.

The other end of the second holding member 44 is sewn to the first holding member 43, and a seam S2 is formed at the other end of the second holding member 44.

The first holding member 43 has a first weak part 431 on the side portion side of the driver seat 2 (backrest 22), that is to say, on the portion facing the side of the backrest 22. The first weak part 431 extends in the width direction of the first holding member 43. The first weak part 431 makes the first holding member 43 easy to tear, such that the first holding member 43 does not obstruct the first part 41a (first molded part R1) during expansion and deployment, allowing for easy and reliable expansion and deployment.

In addition, the second holding member 44 has a second weak part 443 at a position corresponding to, for example, an alignment position with the direction in which the first molded part R1, inflator 42 and the second molded part R2 are aligned. The second weak part 443 extends in the width direction of the second holding member 44. The second weak part 443 makes the second holding member 44 easy to tear, such that the second holding member 44 does not obstruct the second part 41b or the third part 41c (second molded part R2) during expansion and deployment, allowing for easy and reliable expansion and deployment.

Figure 9A:
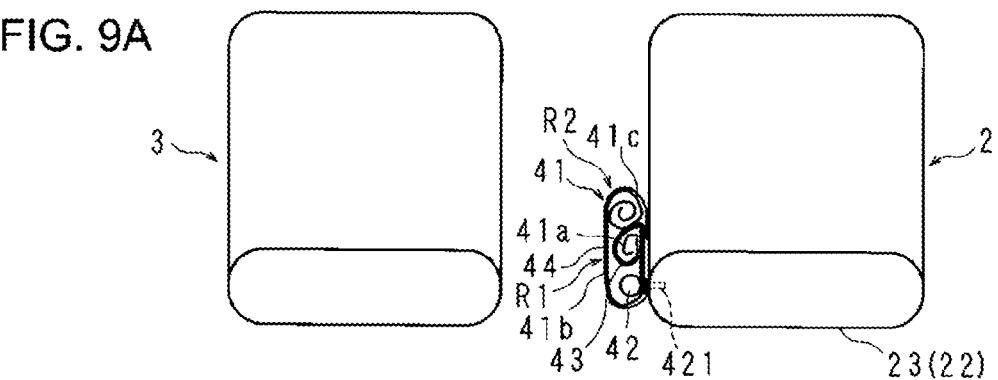
FIGS. 9A through 9C are explanatory views illustrating the process of expansion and deployment of the cushion according to embodiment 1.
Figure 9B:
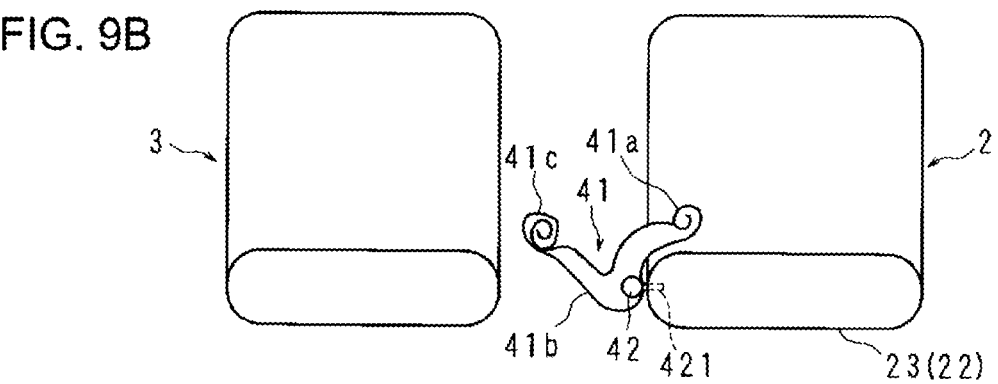
Figure 9C:
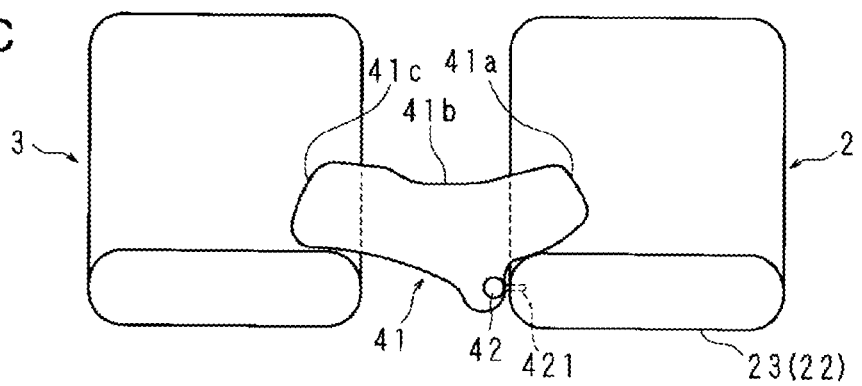

Furthermore, the first weak part 431 is formed in a position corresponding to the direction in which the first part 41a should be deployed (see FIGS. 9A-9C, referenced collectively as "FIG. 9" herein), and the second weak part 443 is formed in a position corresponding to the direction in which the third part 41c should be deployed (see FIG. 9). That is to say, regarding the first holding member 43, the position of the first weak part 431 is torn and opened first, and regarding the second holding member 44, the position of the second weak part 443 is torn and opened first. Thus, the deployment of the first part 41a and the third part 41c is guided.

Note that regarding the present embodiment, the first weak part 431 and the second weak part 443 are described as incisions as an example, however, they are not a limited to this. For example, the first weak part 431 and the second weak part 443 may be a notch, a cut, or the like formed at the edge of the first holding member 43 or the second holding member 44, or may be a slit, an incision, a perforation, or the like formed inside the edge and in the width direction.

The cushion 41, folded into a roll-shape as illustrated in FIG. 7 and FIG. 8, is stowed in the stowing space 40 such that the third part 41c is at the front of the vehicle and the inflator 42 is at the rear of the vehicle, as illustrated in FIG. 3. That is to say, that the third part 41c (the second molded part R2) is stowed more towards the front side of the vehicle than the first part 41a (the first molded part R1). The cushion 41 is attached to the stowing space 40 by the inflator 42 being secured to the skeleton frame 23 by a stud bolt 421. Thereafter, the cushion 41 and the stowing space 40 are covered by the plate cover C1.

FIG. 9 (referring to FIGS. 9A-9C collectively) is an explanatory illustration of the expansion and deployment process of the cushion 41 according to embodiment 1. FIG. 9 is a view seen from above the passenger compartment 1. In FIG. 9, the buffer material C and the plate cover C1 are omitted as a matter of convenience.

FIG. 9A illustrates the state before deployment. FIG. 9B illustrates the state of the cushion 41 during deployment. When deployment begins, regarding the first part 41a, the first weak part 431 of the first holding member 43 is broken and the seam S1 between the other end of the first holding member 43 and the second panel 482 is ripped. In addition, as the first molded part R1 is rolled in a clockwise roll viewed from above the passenger compartment 1, the first molded part R1 deploys towards the driver seat 2. Here, the first part 41a pushes the third part 41c in front of the passenger seat 3.

Furthermore, as described above, the first part 41a (first molded part R1) is interposed between the third part 41c (second molded part R2) and the inflator 42, and the inflator 42 is provided near one end of the first part 41a. Thus, when deployment begins, the first part 41a expands before the third part 41c, pushing the third part 41c to the front side of the vehicle.

The action of the first part 41a causes the unfolding third part 41c to be oriented in the direction of the passenger seat 3.

Furthermore, when deployment begins, regarding the third part 41c, the second weak part 443 of the second holding member 44 is broken and the seam S2 between the other end of the second holding member 44 and the first holding member 43 is ripped. In addition, as the second molded part R2 is rolled in a counterclockwise roll as viewed from above the passenger compartment 1, the third part 41c unfolds while tilting in the direction of the passenger seat 3, in conjunction with the action of the first part 41a as described above.

The second part 41b deploys while tilting in the passenger seat 3 direction, that is to say, in the left direction. On the other hand, as the first molded part R1 is rolled in a clockwise roll, the first molded part R1 deploys while tilting toward the center of the driver seat 2 (backrest 22), as described above. Therefore, the cushion 41 achieves an approximate V-shape, as illustrated in FIG. 9.

FIG. 9C illustrates the completed expansion and deployment of the cushion 41. As illustrated in FIG. 9C, the third part 41C rides up onto the passenger seat 3 when the cushion 41 is in the expanded and deployed state. As a result, in the event of an accident such as a vehicle collision, the occupants seated in the driver seat 2 can be prevented from moving to the passenger seat 3.

Furthermore, as described above, in the process of the deployment of the cushion 41, the gas injected from the inflator 42 is regulated by the straightening sheet 49 and flows on both short sides of the straightening sheet 49, that is to say, in the front and rear direction of the vehicle 100. That is to say, that the gas from the inflator 42 is restricted by the straightening sheet 49 from going directly to the protruding part 41e of the cushion 41.

Therefore, the filling (deployment) of the protruding part 41e is slightly delayed compared to the deployment in the direction of the passenger seat 3. Therefore, even if the passenger seated in the front passenger seat 3 is OOP (Out Of Position: irregular seating posture), the head of the passenger can be prevented from being injured by a strong interference with the cushion 41 during deployment. Thereby, it is possible to provide an airbag device 4 that exhibits favorable results when evaluated for the degree of protection of a passenger who is in an irregular seating posture, or in other words, an OOP test.

In addition, the horizontal part 41d of the cushion 41 deploys at a faster rate towards the horizontal direction of the vehicle 100 than the protruding part 41e. Therefore, the area from the abdomen to the chest of an occupant seated in the passenger seat 3 can be quickly restrained and protected.

The above describes an example of a case where the cushion 41 is stowed with two molded parts, the first molded part R1 and the second molded part R2. However, this is not a limitation, and three (3) or more molded parts can be used.

Embodiment 2

Figure 10:
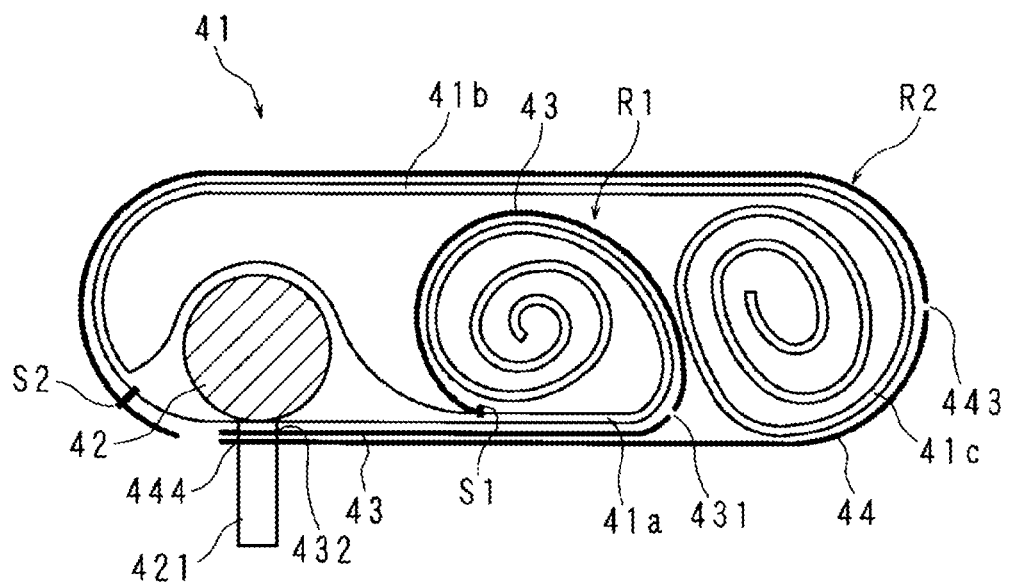
FIG. 10 is a cross-sectional view schematically representing the cushion of the airbag device according to embodiment 2 in a stowed state.

FIG. 10 is a cross-sectional view schematically representing the cushion 41 of the airbag device 4 according to embodiment 2 in a stowed state. FIG. 10 illustrates the cushion 41 stowed in the stowing space 40, and for convenience, only the cushion 41, the inflator 42 and the stud bolt 421 are illustrated.

The first holding member 43 and the second holding member 44 are in the shape of a belt, in the same manner as in embodiment 1.

The first holding member 43 has a through hole 432 formed at one end in the longitudinal direction through which a stud bolt 421 can be inserted. One end of the first holding member 43 is engaged with the stud bolt 421 by inserting the stud bolt 421 into the through hole 432 of the first holding member 43. The first holding member 43 surrounds the first molded part R1 from the side of the first panel 481, and the other end is temporarily joined to the second panel 482 between the inflator 42 and the first molded part R1 in a manner that can be released during expansion and deployment. For example, the other end of the first holding member 43 is sewn to the second panel 482, and a seam S1 is formed at the other end of the first holding member 43. In this manner, the first holding member 43 surrounds the first molded part R1, such that the shape and position of the first molded part R1 is retained until the time of expansion and deployment.

The second holding member 44 has a through hole 444 at one end in the longitudinal direction through which the stud bolt 421 can be inserted. One end of the second holding member 44 is engaged with the stud bolt 421 by inserting the stud bolt 421 into the through hole 444 of the second holding member 44. The second holding member 44 covers the first part 41a (the first molded part R1) from the outside of the first holding member 43 and surrounds the second molded part R2 and the inflator 42. The other end of the second holding member 44 is temporarily joined to the first panel 481 near the inflator 42 in a manner that can be released during expansion and deployment. For example, the other end of the second holding member 44 is sewn to the first panel 481, and a seam S2 is formed at the other end of the second holding member 44. In this manner, the second holding member 44 surrounds the second molded part R2 such that the shape and position of the second molded part R2 is retained until the time of expansion and deployment.

Thus, since the first molded part R1 is held by the first holding member 43 and the second molded part R2 is held by the second holding member 44 until the time of expansion and deployment, problems such as entanglement of the first part 41a and the third part 41c at the time of expansion and deployment can be prevented beforehand.

The first holding member 43 has a first weak part 431 on the side portion side of the driver seat 2 (backrest 22). The first weak part 431 extends in the width direction of the first holding member 43, in the same manner as in embodiment 1. The first weak part 431 makes the first holding member 43 easy to tear, such that the first holding member 43 does not obstruct the first part 41a (first molded part R1) during expansion and deployment, allowing for easy and reliable expansion and deployment.

In addition, the second holding member 44 has a second weak part 443 at a position corresponding to, for example, an alignment position with the direction in which the first molded part R1, inflator 42 and the second molded part R2 are aligned. The second weak part 443 extends in the width direction of the second holding member 44, as in embodiment 1. The second weak part 443 makes the second holding member 44 easy to tear, such that the second holding member 44 does not obstruct the second part 41b or the third part 41c (second molded part R2) during expansion and deployment, allowing for easy and reliable expansion and deployment.

Furthermore, the first weak part 431 is formed at a position corresponding to the direction in which the first part 41a should be deployed, and the second weak part 443 is formed at a position corresponding to the direction in which the third part 41c should be deployed. That is to say, that regarding the first holding member 43, the position of the first weak part 431 is torn and opened first, and regarding the second holding member 44, the position of the second weak part 443 is torn and opened first. Thus, the deployment of the first part 41a and the third part 41c is guided.

The cushion 41, folded into a roll-shape as illustrated in FIG. 10, is stowed in the stowing space 40 such that the third part 41c is toward the front of the vehicle and the inflator 42 is toward the rear of the vehicle, as illustrated in FIG. 3. The cushion 41 is attached to the stowing space 40 by the inflator 42 being secured to the skeleton frame 23 by a stud bolt 421.

Any detailed descriptions of similar parts to embodiment 1 will be omitted, while using the same symbols.

Embodiment 3

Figure 11:
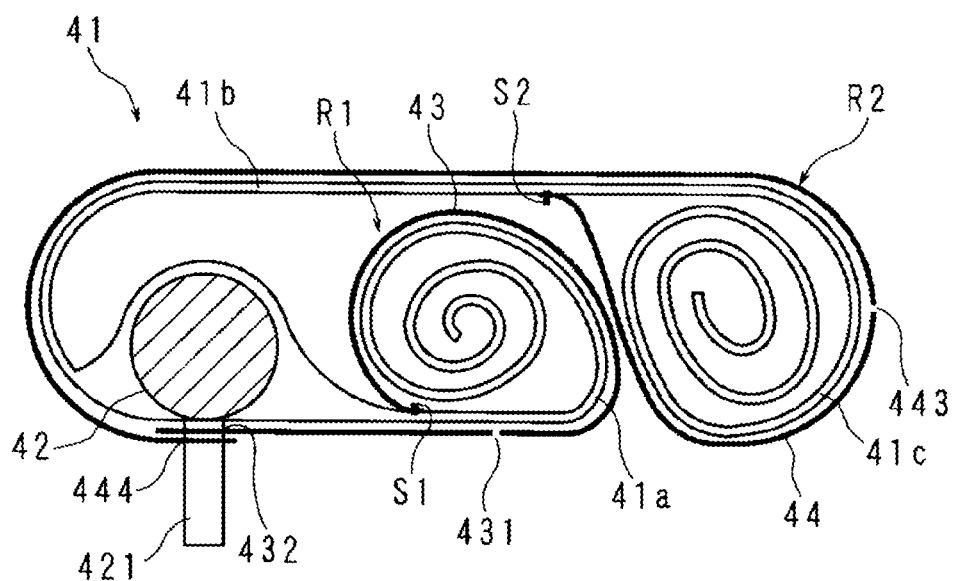
FIG. 11 is a cross-sectional view schematically representing the cushion of the airbag device according to embodiment 3 in a stowed state.

FIG. 11 is a cross-sectional view schematically representing the cushion 41 of the airbag device 4 according to embodiment 3 in a stowed state. FIG. 11 illustrates the cushion 41 stowed in the stowing space 40, and for convenience, only the cushion 41, the inflator 42 and the stud bolt 421 are illustrated.

The first holding member 43 and the second holding member 44 are in the shape of a belt, in the same manner as in embodiment 1.

The first holding member 43 has a through hole 432 formed at one end in the longitudinal direction through which a stud bolt 421 can be inserted. One end of the first holding member 43 is engaged with the stud bolt 421 by inserting the stud bolt 421 into the through hole 432 of the first holding member 43. The first holding member 43 surrounds the first molded part R1 from the side of the first panel 481, and the other end is temporarily joined to the second panel 482 between the inflator 42 and the first molded part R1 in a manner that can be released during expansion and deployment. For example, the other end of the first holding member 43 is sewn to the second panel 482, and a seam S1 is formed at the other end of the first holding member 43. In this manner, the first holding member 43 surrounds the first molded part R1, such that the shape and position of the first molded part R1 is retained until the time of expansion and deployment.

The second holding member 44 has a through hole 444 at one end in the longitudinal direction through which the stud bolt 421 can be inserted. One end of the second holding member 44 is engaged with the stud bolt 421 by inserting the stud bolt 421 into the through hole 444 of the second holding member 44. The second holding member 44 covers the first part 41a (the first molded part R1) from the side of the first panel 481 and surrounds the second molded part R2 and the inflator 42. The other end of the second holding member 44 is temporarily joined to the second panel 482 near the area between the first molded part R1 and the second molded part R2 in a manner that can be released during expansion and deployment. For example, the other end of the second holding member 44 is sewn to the second panel 482, and a seam S2 is formed at the other end of the second holding member 44. In this manner, the second holding member 44 surrounds the second molded part R2 such that the shape and position of the second molded part R2 is retained until the time of expansion and deployment.

Thus, since the first molded part R1 is held by the first holding member 43 and the second molded part R2 is held by the second holding member 44 until the time of expansion and deployment, problems such as entanglement of the first part 41a and the third part 41c at the time of expansion and deployment can be prevented beforehand.

The first holding member 43 has a first weak part 431 on the side portion side of the driver seat 2 (backrest 22), that is to say, on the portion facing the side of the backrest 22. The first weak part 431 extends in the width direction of the first holding member 43, in the same manner as in embodiment 1. The first weak part 431 makes the first holding member 43 easy to tear, such that the first holding member 43 does not obstruct the first part 41a (first molded part R1) during expansion and deployment, allowing for easy and reliable expansion and deployment.

In addition, the second holding member 44 has a second weak part 443 at a position corresponding to, for example, an alignment position with the direction in which the first molded part R1, inflator 42 and the second molded part R2 are aligned. The second weak part 443 extends in the width direction of the second holding member 44, as in embodiment 1. The second weak part 443 makes the second holding member 44 easy to tear, such that the second holding member 44 does not obstruct the second part 41b or the third part 41c (second molded part R2) during expansion and deployment, allowing for easy and reliable expansion and deployment.

Furthermore, the first weak part 431 is formed at a position corresponding to the direction in which the first part 41a should be deployed, and the second weak part 443 is formed at a position corresponding to the direction in which the third part 41c should be deployed. Thus, the deployment of the first part 41a and the third part 41c is guided.

Any detailed descriptions of similar parts to embodiment 1 or embodiment 2 will be omitted, while using the same symbols.

Embodiment 4

Figure 12:
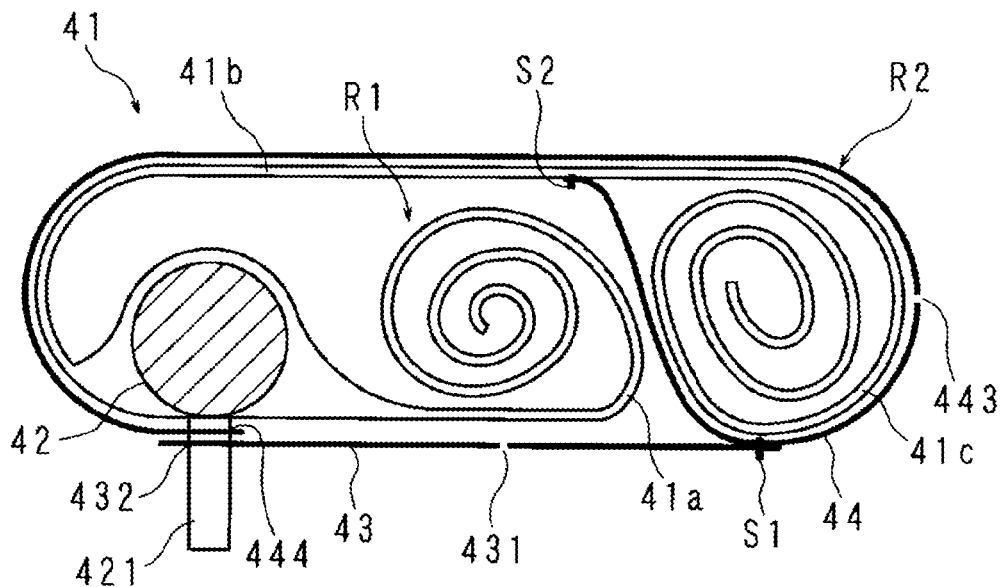
FIG. 12 is a cross-sectional view schematically representing the cushion of the airbag device according to embodiment 4 in a stowed state.

FIG. 12 is a cross-sectional view schematically representing the cushion 41 of the airbag device 4 according to embodiment 4 in a stowed state. FIG. 12 illustrates the cushion 41 stowed in the stowing space 40, and for convenience, only the cushion 41, the inflator 42 and the stud bolt 421 are illustrated.

The first holding member 43 and the second holding member 44 are in the shape of a belt, in the same manner as in embodiment 1.

The second holding member 44 has a through hole 444 at one end in the longitudinal direction through which the stud bolt 421 can be inserted. One end of the second holding member 44 is engaged with the stud bolt 421 by inserting the stud bolt 421 into the through hole 444 of the second holding member 44. The second holding member 44 covers the first part 41a (the first molded part R1) from the side of the first panel 481 and surrounds the second molded part R2 and the inflator 42. The other end of the second holding member 44 is temporarily joined to the second panel 482 near the area between the first molded part R1 and the second molded part R2 in a manner that can be released during expansion and deployment. For example, the other end of the second holding member 44 is sewn to the second panel 482, and a seam S2 is formed at the other end of the second holding member 44. In this manner, the second holding member 44 surrounds the second molded part R2 such that the shape and position of the second molded part R2 is retained until the time of expansion and deployment.

The first holding member 43 has a through hole 432 formed at one end in the longitudinal direction through which a stud bolt 421 can be inserted. One end of the first holding member 43 is engaged with the stud bolt 421 by inserting the stud bolt 421 into the through hole 432 of the first holding member 43. The first holding member 43 covers the first molded part R1 from the side of the first panel 481, and the other end is temporarily joined to the second holding member 44 in the vicinity of the second molded part R2 in a manner that can be released upon expansion and deployment. For example, the other end of the first holding member 43 is sewn to the second holding member 44, and a seam S1 is formed at the other end of the first holding member 43. In this manner, the first molded part R1 is sandwiched by the second holding member 44 and the first holding member 43, and the shape and position of the first molded part R1 is retained until expansion and deployment.

Thus, since the first molded part R1 is held by the first holding member 43 and the second molded part R2 is held by the second holding member 44 until the time of expansion and deployment, problems such as entanglement of the first part 41a and the third part 41c at the time of expansion and deployment can be prevented beforehand.

The first holding member 43 has a first weak part 431 on the side portion side of the driver seat 2 (backrest 22), that is to say, on the portion facing the side of the backrest 22. The first weak part 431 extends in the width direction of the first holding member 43, in the same manner as in embodiment 1. The first weak part 431 makes the first holding member 43 easy to tear, such that the first holding member 43 does not obstruct the first part 41a (first molded part R1) during expansion and deployment, allowing for easy and reliable expansion and deployment.

In addition, the second holding member 44 has a second weak part 443 at a position corresponding to, for example, an alignment position with the direction in which the first molded part R1, inflator 42 and the second molded part R2 are aligned. The second weak part 443 extends in the width direction of the second holding member 44, as in embodiment 1. The second weak part 443 makes the second holding member 44 easy to tear, such that the second holding member 44 does not obstruct the second part 41b or the third part 41c (second molded part R2) during expansion and deployment, allowing for easy and reliable expansion and deployment.

Furthermore, the first weak part 431 is formed at a position corresponding to the direction in which the first part 41a should be deployed, and the second weak part 443 is formed at a position corresponding to the direction in which the third part 41c should be deployed. Thus, the deployment of the first part 41a and the third part 41c is guided.

Any detailed descriptions of similar parts to embodiment 1, embodiment 2, or embodiment 3 will be omitted, while using the same symbols.

Embodiment 5

Figure 13:
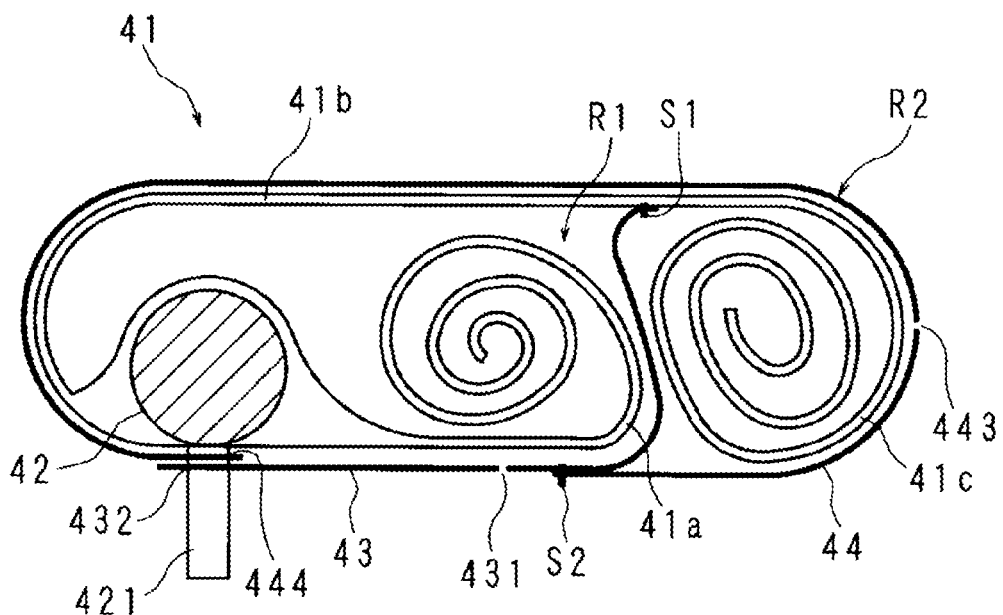
FIG. 13 is a cross-sectional view schematically representing the cushion of the airbag device according to embodiment 5 in a stowed state.

FIG. 13 is a cross-sectional view schematically representing a cushion 41 of the airbag device 4 according to embodiment 5 in a stowed state. FIG. 13 illustrates the cushion 41 stowed in the stowing space 40, and for convenience, only the cushion 41, the inflator 42 and the stud bolt 421 are illustrated.

The first holding member 43 and the second holding member 44 are in the shape of a belt, in the same manner as in embodiment 1.

The first holding member 43 has a through hole 432 formed at one end in the longitudinal direction through which a stud bolt 421 can be inserted. One end of the first holding member 43 is engaged with the stud bolt 421 by inserting the stud bolt 421 into the through hole 432 of the first holding member 43. The first holding member 43 surrounds the first molded part R1 from the side of the first panel 481, and the other end is temporarily joined to the second panel 482 between the second molded part R2 and the first molded part R1 in a manner that can be released upon expansion and deployment. For example, the other end of the first holding member 43 is sewn to the second panel 482, and a seam S1 is formed at the other end of the first holding member 43. In this manner, the first holding member 43 surrounds the first molded part R1, such that the shape and position of the first molded part R1 is retained until the time of expansion and deployment.

The second holding member 44 has a through hole 444 at one end in the longitudinal direction through which the stud bolt 421 can be inserted. One end of the second holding member 44 is engaged with the stud bolt 421 by inserting the stud bolt 421 into the through hole 444 of the second holding member 44. The second holding member 44 covers the first part 41a (the first molded part R1) from the side of the first panel 481 and surrounds the second molded part R2 and the inflator 42. The other end of the second holding member 44 is temporarily joined to the first holding member 43 in the vicinity of the first molded part R1 in a manner that can be released during expansion and deployment. For example, the other end of the second holding member 44 is sewn to the first holding member 43, and a seam S2 is formed at the other end of the second holding member 44. That is to say, that the second molded part R2 is surrounded by the second holding member 44 and is sandwiched by the first holding member 43 and the second holding member 44. Therefore, the shape and position of the second molded part R2 is held until expansion and deployment.

Thus, since the first molded part R1 is held by the first holding member 43 and the second molded part R2 is held by the second holding member 44 until the time of expansion and deployment, problems such as entanglement of the first part 41a and the third part 41c at the time of expansion and deployment can be prevented beforehand.

The first holding member 43 has a first weak part 431 on the side portion side of the driver seat 2 (backrest 22) that extends in the width direction of the first holding member 43. The first weak part 431 makes the first holding member 43 easy to tear, such that the first holding member 43 does not obstruct the first part 41a (first molded part R1) during expansion and deployment, allowing for easy and reliable expansion and deployment.

In addition, the second holding member 44 has a second weak part 443 formed extending in the width direction of the second holding member 44 at a position corresponding to, for example, an alignment position with the direction in which the first molded part R1, the inflator 42 and the second molded part R2 are aligned. The second weak part 443 makes the second holding member 44 easy to tear, such that the second holding member 44 does not obstruct the second part 41b or the third part 41c (second molded part R2) during expansion and deployment, allowing for easy and reliable expansion and deployment.

Furthermore, the first weak part 431 is formed at a position corresponding to the direction in which the first part 41a should be deployed, and the second weak part 443 is formed at a position corresponding to the direction in which the third part 41c should be deployed. Thus, the deployment of the first part 41a and the third part 41c is guided.

Any detailed descriptions of similar parts to embodiment 1, embodiment 2, embodiment 3, or embodiment 4 will be omitted, while using the same symbols.

EXPLANATION OF CODES

2: driver seat
3: Passenger seat
4: Airbag device
41: Cushion (airbag)
42: Inflator
43: First holding member
44: Second holding member
100: Vehicle
421: Stud bolt
431: First weak part
443: Second weak part
R1: First molded part
R2: Second molded part
S1, S2: Seams

The invention claimed is:

1. An airbag device mounted on one side of a vehicle seat in which both ends of a seat-shaped airbag that are opposed in horizontal and longitudinal directions during expansion and deployment are respectively bent a plurality of times and formed into molded parts, and is provided with a first holding member that holds the first molded part on one end of either of the ends at least until the start of expansion and deployment and a second holding member that holds the second molded part on the other end at least until the start of expansion and deployment.

2. The airbag device according to claim 1 comprising an inflator provided closer to one end inside the airbag that injects gas, wherein the first molded part, inflator, and second molded part are arranged so that the first molded part is interposed between the inflator and the second molded part within the airbag prior to expansion and deployment.

3. The airbag device according to claim 2, wherein the second holding member has a second weak part that surrounds the second molded part and is formed at a position corresponding with the direction in which the inflator, the first molded part, and the second molded part are aligned.

4. The airbag device according to claim 1, wherein the first holding member is formed with a first weak part on one side of the seat.

5. The airbag device according to claim 2, wherein the first holding member surrounds the first molded part, one end is secured by a securing member that secures the inflator to one side of the seat, and the other end corresponding to the one end is joined with the airbag between the inflator and the first molded part in a manner that can be released during expansion and deployment.

6. The airbag device according to claim 5, wherein the second holding member surrounds the inflator and the second molded part, one end is secured by the securing member, and the other end corresponding to the one end is joined with the first holding member in a manner that can be released during expansion and deployment.

7. The airbag device according to claim 5, wherein the second holding member surrounds the inflator and the second molded part, one end is secured by the securing member, and the other end corresponding to the one end is joined with the airbag near the inflator in a manner that can be released during expansion and deployment.

8. The airbag device according to claim 5, wherein the second holding member surrounds the inflator and the second molded part, one end is secured by the securing member, and the other end corresponding to the one end is joined with the airbag in between the first molded part and the second molded part in a manner that can be released during expansion and deployment.

9. The airbag device according to claim 2, wherein the second holding member surrounds the inflator and the second molded part, one end is secured by the securing member that secures the inflator to one side of the seat, the other end corresponding to the one end is joined with the airbag between the first molded part and the second molded part in a manner that can be released during expansion and deployment, wherein for the first holding member, a first end is secured by the securing member, the other end corresponding to the one end is joined with the second holding member near the second molded part in a manner that can be released during expansion and deployment.

10. The airbag device according to claim 2, wherein for the first holding member, one end is secured by the securing member that secures the inflator to one side of the seat, the other end portion corresponding to the one end is joined with the airbag between the first molded part and the second molded part in a manner that can be released during expansion and deployment, wherein the second holding member surrounds the inflator and the second molded part and the other end corresponding to the one end is joined with the first holding member in a manner that can be released during expansion and deployment.

\* \* \* \* \*